(12) United States Patent
Schwinghammer

(10) Patent No.: US 8,121,604 B1
(45) Date of Patent: Feb. 21, 2012

(54) SYSTEMS AND METHODS FOR OPERATING WIRELESS NETWORKS

(75) Inventor: Patrick Allen Schwinghammer, Denver, CO (US)

(73) Assignee: Nextel Communications Inc., Reston, VA (US)

(*) Notice: Subject to any disclaimer, the term of this patent is extended or adjusted under 35 U.S.C. 154(b) by 1489 days.

(21) Appl. No.: 11/366,620

(22) Filed: Mar. 3, 2006

Related U.S. Application Data

(60) Provisional application No. 60/658,370, filed on Mar. 4, 2005.

(51) Int. Cl.
*H04Q 7/20* (2006.01)

(52) U.S. Cl. .......... 455/444; 455/435.1; 455/435.2; 455/435.3; 455/436; 455/437; 455/438; 455/439; 455/440; 455/441; 455/442; 445/443; 370/331; 370/332; 370/333

(58) Field of Classification Search .......... 455/444, 455/449, 433, 446, 435.1, 435.2, 435.3, 436, 455/437, 438, 439, 440, 441, 442, 443; 370/331, 370/332, 333
See application file for complete search history.

(56) References Cited

U.S. PATENT DOCUMENTS

| | | | | |
|---|---|---|---|---|
| 5,392,453 A * | 2/1995 | Gudmundson et al. | ....... | 455/444 |
| 5,459,759 A | 10/1995 | Schilling | | |
| 5,551,060 A | 8/1996 | Fujii et al. | | |
| 5,557,657 A * | 9/1996 | Barnett | ......... | 455/444 |
| 5,822,698 A * | 10/1998 | Tang et al. | ........... | 455/447 |
| 5,953,661 A * | 9/1999 | Schwinghammer et al. | . | 455/423 |
| 6,212,385 B1 | 4/2001 | Thomas et al. | | |
| 6,363,261 B1 | 3/2002 | Raghavan | | |
| 6,405,046 B1 * | 6/2002 | Kumaran et al. | ............ | 455/453 |
| 6,853,845 B2 | 2/2005 | Hsu et al. | | |
| 2002/0137518 A1 * | 9/2002 | Achour | .......... | 455/447 |
| 2004/0072565 A1 * | 4/2004 | Nobukiyo et al. | ........... | 455/436 |
| 2005/0130662 A1 * | 6/2005 | Murai | ............ | 455/444 |
| 2006/0019665 A1 * | 1/2006 | Aghvami et al. | ............ | 455/444 |
| 2006/0111108 A1 * | 5/2006 | Newbury et al. | ............. | 455/436 |

* cited by examiner

*Primary Examiner* — Patrick Edouard
*Assistant Examiner* — Fred Casca

(57) ABSTRACT

Systems and methods for wireless networks with inner and outer cells are provided. A base station determines an amount of traffic on an inner and outer cell. When the traffic exceed a predetermined threshold value, traffic is adjusted on the inner or outer cell. Traffic can be adjusted by handing off some of the traffic from the inner cell to the outer cell, from the outer cell to the inner cell, between sectors of the inner or outer cells and/or by handing off traffic to a proximately located base station.

23 Claims, 4 Drawing Sheets

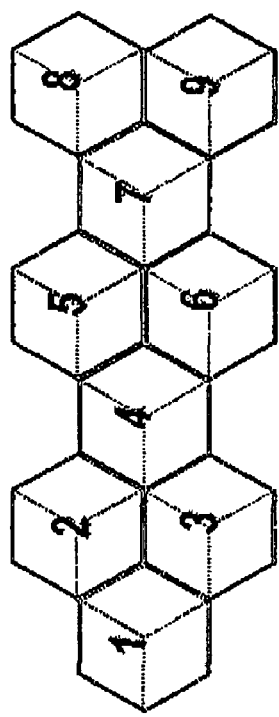
Figure 2a
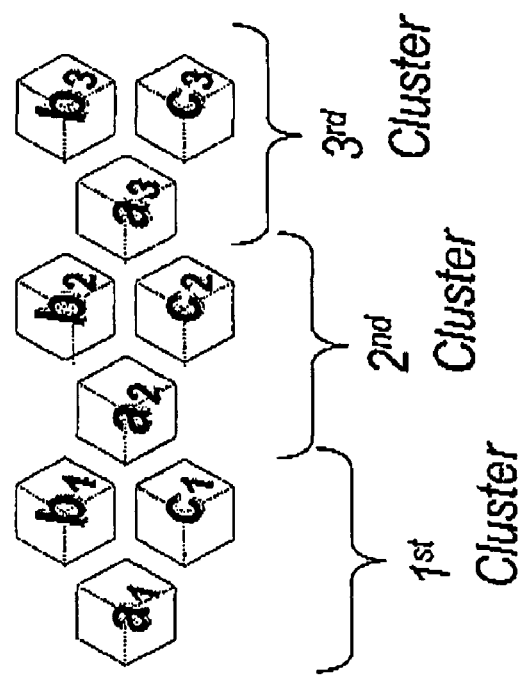
Figure 2b
Cell Assignments
| Inner Cells | Outer Cells | |
|---|---|---|
| 1 | $a_1$ | |
| 4 | $a_2$ | Group $a$ |
| 7 | $a_3$ | |
| 2 | $b_1$ | |
| 5 | $b_2$ | Group $b$ |
| 8 | $b_3$ | |
| 3 | $c_1$ | |
| 6 | $c_2$ | Group $c$ |
| 9 | $c_3$ | |
Figure 2c

SYSTEMS AND METHODS FOR OPERATING WIRELESS NETWORKS

The present application claims priority under 35 U.S.C. §119 to U.S. Provisional Application No. 60/658,370, filed Mar. 4, 2005, the entire disclosure of which is herein expressly incorporated by reference.

BACKGROUND OF THE INVENTION

The popularity of wireless networks has resulted in a desire for wireless network operators to increase the capacity of their networks. One way to increase capacity is to use more frequencies over the air interface between base stations and mobile stations. However, most frequencies are allocated by governments bodies and most, if not all, available frequencies have been allocated. Another way to increase capacity is to add cell stations by decreasing the size of existing cells. However, adding base stations requires time consuming and expensive zoning approvals from local government bodies. It also requires additional costs for the equipment for the additional base stations, as well as costs associated with leasing space for the equipment.

SUMMARY OF THE INVENTION

One technique for increasing network capacity with minimal increased costs is to deploy a so-called overlay-underlay networks, such as that described in U.S. Pat. No. 5,953,661, the entire contents of which are herein expressly incorporated by reference. In the overlay-underlay networks a base station supports concentric cells, including an inner cell and an outer cell. Exemplary embodiments of the present invention are directed to improvements to overlay-underlay and similar types of networks.

In accordance with exemplary embodiments of the present invention, traffic on an inner cell and outer cell is monitored. When traffic on one of the inner or outer cells exceeds a threshold value, the traffic can be adjusted to avoid call blocking. The traffic can be adjusted by handing off calls from the inner or outer cell with traffic exceeding a threshold value to the other of the cells of a base station, or to cells of another proximately located base station.

Other objects, advantages and novel features of the present invention will become apparent from the following detailed description of the invention when considered in conjunction with the accompanying drawings.

BRIEF DESCRIPTION OF THE DRAWING FIGURES

FIGS. 2a-2c illustrate an exemplary reuse pattern for inner and outer cell frequencies in accordance with the present invention;

DETAILED DESCRIPTION OF THE PREFERRED EMBODIMENTS

Figure 1B:
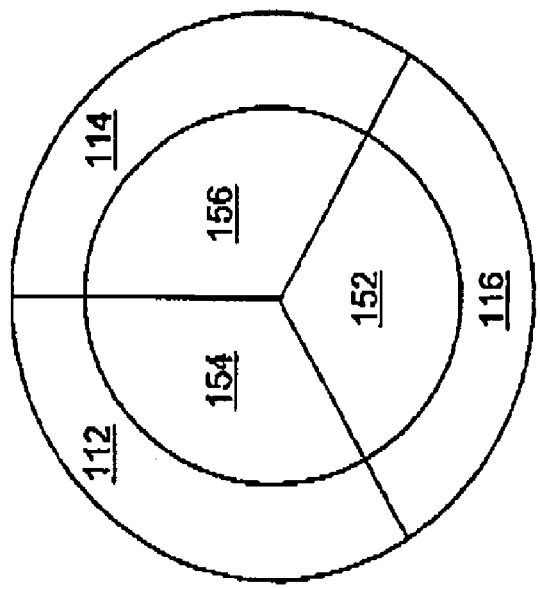
FIGS. 1a and 1b illustrate exemplary inner and outer cell arrangements in accordance with the present invention.
Figure 1A:
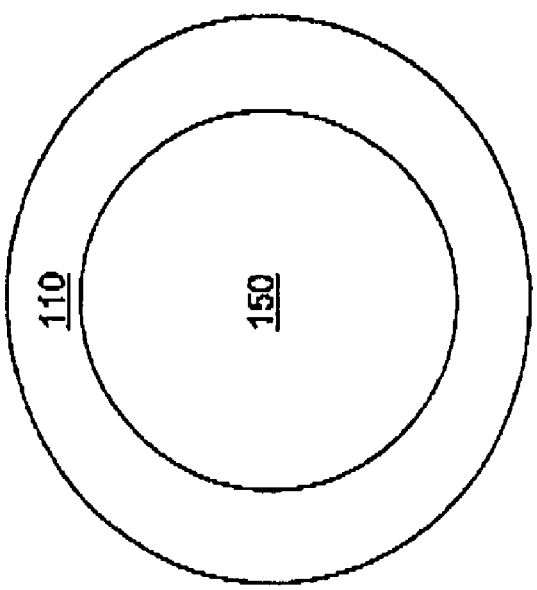

FIGS. 1a and 1b illustrate exemplary inner and outer cell arrangements in accordance with the present invention. Specifically, FIG. 1a illustrates an exemplary single sector base station with an outer cell 110 and an inner cell 150. The inner and outer cells 110 and 150 are generated by a single base station, thereby eliminating the additional expenses associated with adding base stations. Specifically, existing antennas and base station radios can be divided between the inner and outer cells 110 and 150, further reducing additional equipment costs. FIG. 1b illustrates an exemplary three sector inner and outer cell arrangement in accordance with the present invention. The outer cell includes sectors 112-116 and the inner cell includes sectors 152-156. In some implementations the sectors can be supported by three antennas, where two antennas are receiving antennas and one antenna is a transmit/receive antenna. Although FIGS. 1a and 1b illustrate only two concentric cells, the base station can support more than two concentric cells. The base station can support dispatch voice, interconnect voice, short message service (SMS), and/or packet data on the inner and/or outer cell. In addition, the base station can handoff dispatch voice, interconnect voice and/or packet data calls from the inner cell to the outer cell, from the outer cell to the inner cell, from one sector of the inner cell to another sector of the inner cell, from one sector of the outer cell to another sector of the outer cell, and to inner or outer cells of other base stations.

FIGS. 2a-2c illustrate an exemplary reuse pattern for inner and outer cell frequencies in accordance with the present invention. As illustrated in FIGS. 2a-2c, a "tighter" frequency reuse pattern can be deployed for the inner cells than the outer cells. Specifically, the inner cells have a reuse pattern of K=3, while the outer cells employ a reuse pattern of K=9.

Figure 3:
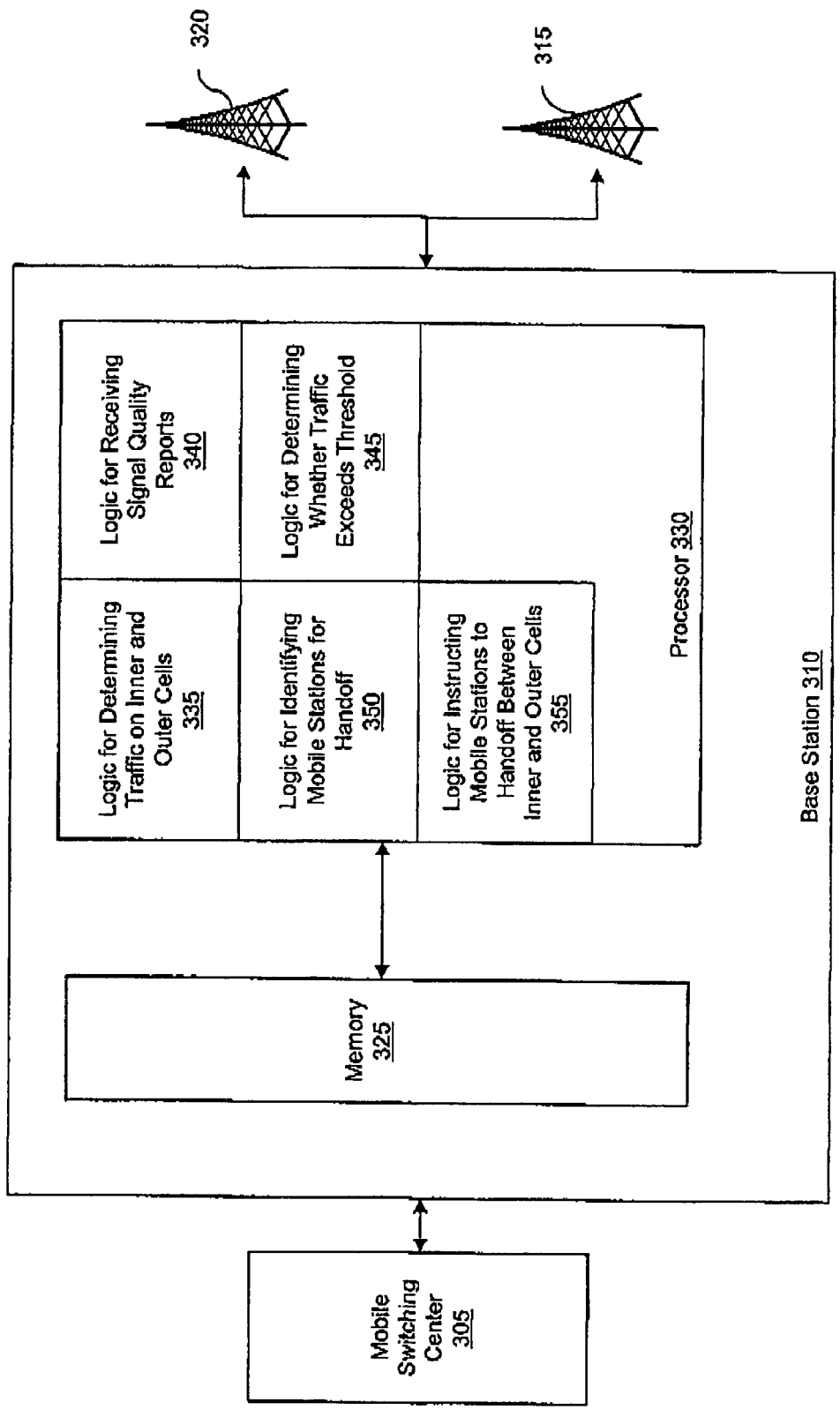
FIG. 3 illustrates an exemplary base station in accordance with the present invention.

FIG. 3 illustrates an exemplary base station in accordance with the present invention. The base station 310 is coupled to a mobile switching center 305 and to antennas 315 and 320. Mobile switching center 305 can be coupled to other base stations (not illustrated). Antenna 315 can be used for the inner cell by downtilting the antenna to control its radiation pattern, while antenna 320 can be used to support the outer cell. Base station 310 includes a memory 325 and processor 330. Memory can be any type of memory, including a random access memory, read only memory, flash memory, hard disk and/or the like. Processor 330 can be a microprocessor executing programmable code provided by memory 325, an application specific integrated circuit (ASIC), field programmable gate array and/or the like. Processor 330 includes various logic 335-355 which will be described in more detail below in connection with FIG. 4.

It should be recognized that base station 310 can include hardware in addition to that illustrated in. FIG. 3. For example, base station 310 can include a number of base radios, diplexer, baseband processing units, upconverters/downconverters and the like.

Figure 4:
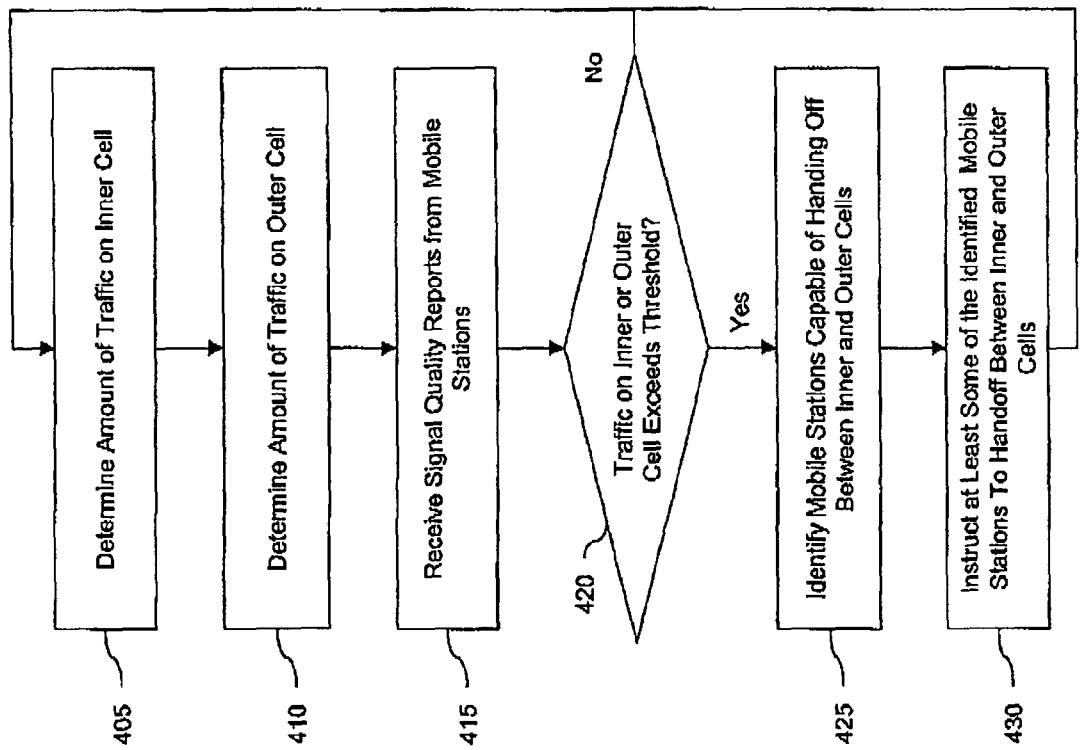
FIG. 4 illustrates an exemplary method in accordance with the present invention.

FIG. 4 illustrates an exemplary method in accordance with the present invention. Logic 335 monitors the inner and outer cells in order to determine the amount of traffic at the cells (steps 405 and 410). Logic 340 receives and processes signal quality reports from mobile stations (step 415). The signal quality reports can include a received signal strength indicator (RSSI), carrier-to-interference ratio (C/I) and/or the like. The signal quality reports can include signal quality of the inner and outer cells of the base station, as well as signal quality of inner and outer cells of proximately located base stations. Logic 345 compares the traffic of the inner and outer cells to a threshold to determine whether the traffic exceeds a predetermined threshold value (step 420). The predetermined threshold value is selected to be some value below where call blocking will occur, and can the same for the inner and outer cells or can be different. When the traffic on the inner or outer cells does not exceed a threshold value ("No" path out of decision step 420), then the base station continues to determine the amount of traffic on the inner and outer cells and receive signal quality reports (steps 405-415).

When the traffic on the inner or outer cells exceeds a threshold value ("Yes" path out of decision step 425), then logic 350 identifies mobile stations as candidates for handoff (step 430). Mobile stations are candidates for handoff when they can receive an acceptable signal from the other of the inner or outer cells and/or from inner or outer cells of another base station. Logic 355 then instructs at least some of the identified mobile stations to handoff to inner or outer cells of the base station or to inner or outer cells of another base station (step 430). Additionally, or alternatively, some mobile stations can handoff between sectors of the inner and/or outer cells. The base station then continues monitor the traffic on the inner and outer cells.

Although FIG. 4 illustrates particular acts being performed in particular order, some of these acts need not necessarily be performed in this order. For example, the determination of the amount of traffic on the inner and outer cells and receipt of the signal quality reports from the mobile stations can be performed in parallel, and can also be performed while identifying the mobile stations and/or while instructing the identified mobile stations to handoff. Although the logic of FIG. 3 are illustrated as separate elements, the logic can be combined in various manners. For example, the logic for identifying mobile stations 350 and logic for instructing mobile stations to handoff 355 can be part of a logic for adjusting traffic of the inner or outer cells.

Although exemplary embodiments have been described above with processor 330 of base station 310 determining the amount of traffic, monitoring the traffic to determine whether it exceeds a threshold value and instructing mobile stations to handoff, some or all of this processing can be performed in other network elements, such as the mobile switching center 305.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for operating a base station, the method comprising the acts of:
   determining, by a processor, an amount of traffic on an inner cell of the base station;
   determining, by the processor, an amount of traffic on an outer cell of the base station;
   determining, by the processor, that the amount of traffic on the inner or outer cell exceeds a predetermined threshold value; and
   adjusting traffic of the inner and outer cells using handoff to reduce the amount of traffic on the inner or outer cell below the predetermined threshold value, wherein the inner and outer cells use different frequencies, the inner cell includes a plurality of sectorized cells and the outer cell includes a plurality of sectorized cells, each sectorized cell of the inner cell includes an outer boundary defining an inner boundary of a corresponding sectorized cell of the outer cell, each sectorized cell of the inner cell and the corresponding sectorized cell of the outer cell includes side boundaries defined by a line originating at a base station located at a center of the inner and outer cells and terminating at an outer boundary of the corresponding sectorized cell of the outer cell, wherein each sector of the sectorized cells of the inner cell has an has an approximately pie slice shape and the traffic adjustment using handoff involves a handoff of a first mobile station between sectors of the inner cell, and a handoff of a second mobile station between the inner and outer cells wherein the inner and outer cells are part of a network in which a frequency reuse pattern for inner cells is different than a frequency reuse pattern for outer cells.

2. The method of claim 1, wherein the act of adjusting comprises the act of:
   handing off traffic from the inner cell to the outer cell.

3. The method of claim 1, wherein the act of adjusting comprises the act of:
   handing off traffic from the outer cell to the inner cell.

4. The method of claim 1, wherein the act of adjusting comprises the act of:
   handing off traffic from the inner cell to an outer cell of another base station.

5. The method of claim 1, wherein the act of adjusting comprises the act of:
   handing off traffic from the inner cell to an inner cell of another base station.

6. The method of claim 1, wherein traffic on the inner and outer cells of the base station include dispatch voice, interconnect voice, short message service (SMS) and packet data traffic.

7. The method of claim 1, wherein the predetermined threshold value corresponds to an amount of traffic less than an amount of traffic that would result in blocking on the inner or outer cell.

8. The method of claim 1, wherein the act of adjusting traffic comprises the acts of:
   identifying mobile stations capable of handing off between the inner and outer cells; and
   instructing at least some of the identified mobile stations to handoff between the inner and outer cells.

9. The method of claim 8, further comprising the act of:
   collecting signal quality measurement reports from a plurality of mobile stations supported by the base station.

10. The method of claim 9, wherein the signal quality measurement reports include received signal strength indications and carrier-to-interference ratio estimations.

11. The method of claim 9, wherein the signal quality measurement reports include signal quality measurements for the inner and outer cells.

12. The method of claim 11, wherein the signal quality measurement reports also include signal quality measurements of base stations proximately located to the base station.

13. A base station comprising: a memory; and a processor coupled to the memory, the processor comprising
   logic for determining an amount of traffic on an inner cell and an outer cell of the base station;
   logic for determining that the amount of traffic on the inner or outer cell exceeds a predetermined threshold value; and
   logic for adjusting traffic of the inner or outer cells using handoff to reduce the amount of traffic on the inner or outer cell below the predetermined threshold value, wherein the inner and outer cells use different frequencies, and adjusting traffic of the inner and outer cells using handoff to reduce the amount of traffic on the inner or outer cell below the predetermined threshold value, wherein the inner and outer cells use different frequencies, the inner cell includes a plurality of sectorized cells and the outer cell includes a plurality of sectorized cells, each sectorized cell of the inner cell includes an outer boundary defining an inner boundary of a corresponding sectorized cell of the outer cell, each sectorized cell of the inner cell and the corresponding sectorized cell of the outer cell includes side boundaries defined by a line originating at a base station located at a center of the inner and outer cells and terminating at an outer boundary of the corresponding sectorized cell of the outer cell, wherein each sector of the sectorized cells of the inner cell has an has an approximately pie slice shape and the traffic adjustment using handoff involves a handoff of a first mobile station between sectors of the inner cell, and a handoff of a second mobile station between the inner and outer cells wherein the inner and outer cells are part of a network in which a frequency reuse pattern for inner cells is different than a frequency reuse pattern for outer cells.

14. The base station of claim 13, wherein the logic for adjusting traffic controls handoff of traffic from the inner cell to the outer cell.

15. The base station of claim 13, wherein the logic for adjusting traffic controls handoff of traffic from the outer cell to the inner cell.

16. The base station of claim 13, wherein the logic for adjusting traffic controls handoff from one of the inner and outer cells of the base station to a cell of another base station.

17. The base station of claim 13, wherein traffic on the inner and outer cells of the base station include dispatch voice, interconnect voice, short message service (SMS) and packet data traffic.

18. The base station of claim 13, wherein the predetermined threshold value corresponds to an amount of traffic less than an amount of traffic that would result in blocking on the inner or outer cell.

19. The base station of claim 13, wherein the logic for adjusting traffic comprises:

logic for identifying mobile stations capable of handing off between the inner and outer cells; and logic for instructing at least some of the identified mobile stations to handoff between the inner and outer cells.

20. The base station of claim 19, further comprising:

logic for collecting signal quality measurement reports from a plurality of mobile stations supported by the base station.

21. The base station of claim 20, wherein the signal quality measurement reports include received signal strength indications and carrier-to-interference ratio estimations.

22. The base station of claim 20, wherein the signal quality measurement reports include signal quality measurements for the inner and outer cells.

23. The base station of claim 22, wherein the signal quality measurement reports also include signal quality measurements of base stations proximately located to the base station.

\* \* \* \* \*